Patented Apr. 26, 1949

2,468,131

UNITED STATES PATENT OFFICE 2,468,131

METHOD OF MANUFACTURING RECTIFIER ELEMENTS

Murray J. Stateman, Brooklyn, N. Y., assignor to Federal Telephone and Radio Corporation, New York, N. Y., a corporation of Delaware No Drawing. Application July 17, 1945, Serial No. 605,617

1 Claim. (Cl. 175—366)

The invention refers to a method of manufacturing rectifier elements, particularly those which can withstand a very high reverse voltage.

In accordance with the present invention there is provided a rectifier element which can withstand up to more than five times the normal reverse voltage.

It is very well known that in the manufacturing of rectifier elements a base plate is covered with a rectifying layer of selenium onto which a counterelectrode is then applied and this assembly can be processed to enable the rectifier elements to withstand high reverse voltage by providing a barrier layer between the selenium and the counter electrode layer. In some instances formation of the barrier layer is facilitated by the application of insulating lacquers or oxidizing agents to the metallic selenium surface.

It is further known that the manufacturing steps can be modified by providing a selenium layer on a counter electrode alloy and then applying a nickel plated base plate to the selenium layer. This type of rectifier is known as an inverse rectifier. The process according to this invention is particularly concerned with providing a barrier layer in this inverse rectifier between the selenium and the counter electrode alloy.

It is the object of the present invention to provide a process useful in forming barrier layers in selenium rectifiers without necessitating use of insulating lacquers or oxidizing agents on the selenium layer.

In accordance with the present invention selenium rectifier elements are prepared by a process which includes the step of electrolyzing an alkaline aqueous solution containing an organic substance and the reaction product of selenium and an alkaline material whereby the surface of the anode becomes coated with an organic metallic selenium compound. It is preferred to form the anode of a material such as cadmium whereby the anode surface becomes coated with a cadmium organic polyselenide. When the anode is formed of tin the corresponding tin compound is produced as a result of the electrolytic process.

In accordance with the present invention an aqueous solution containing an alkaline hydroxide or alkaline salt, e. g. NaOH, KCl, ammonium hydroxide, or ammonium salts and in addition selenium dissolved in the solution as well as an organic agent, the nature of which is to be disclosed later, is used as the electrolyte in the electrolytic process. A cadmium plate or better a cadmium plated nickel plate serves as the anode in this process, whereas any relatively inert material, preferably platinum or still better any selenium treated inert material, serves as the cathode in this process. Besides the above mentioned metals, namely cadmium or cadmium plated nickel tin, lead, silver, gold, zinc, copper, brass and others can be used as anode with the corresponding solution in the electrolytic process. The applied current may vary from 2.5 ma. per cm.$^2$ up to 50 ma. per cm.$^2$ of cadmium plate surface. As the result of the electrolytic process a layer of cadmium, tin or other metal organic polyselenide which is a stable compound will be formed on the surface of the cadmium plate immediately in one step upon application of the electrolytic process.

The concentration of the electrolyte may be as low as necessary to merely maintain the conductivity of the solution say about .001 normal, whereas the maximum concentration to be used will be at the saturation point at room temperature.

An example is given which shows the preferable choice of materials:

Example

Solution:
  1 part methyl alcohol by volume.
  9 parts 4 normal NaOH by volume.
  Selenium dissolved in the NaOH solution at the rate of 1 part in 50 by weight.
Anode:
  Cadmium treated plate.
Cathode:
  Platinum (or selenium treated plate).
Current:
  12½ ma. cm.$^2$
Time:
  1 minute.

While there is a marked difference in results when the electrolyte concentration is varied, since the increase in both the forward and reverse resistances is proportional to the concentration of the electrolyte, it can be seen that the grade of concentration of the electrolyte provides some means to control the results to be achieved. It has been stated before that the electrolyte comprises an aqueous solution containing alkaline hydroxide or alkaline salt in which selenium is dissolved and in addition an organic agent. Principally all organic agents which are soluble in water can be used as addition to the electrolyte. Therefore, alcohols, aldehydes, ketones, acids, phenols and the like can be used, or also more than one of the mentioned products at the same time. The concentration of the organic agents will be at least 5% and any higher concentration than the minimum value will yield high voltage rectifiers provided that the solution is still electrically conductive at said particular concentration.

As stated before the result of the electrolytic process will be a layer of cadmium organic selenide or any other metal organic selenide depending upon the metal used as anode in the electrolytic process. A selenium layer is then provided on the layer of metal organic selenide and finally a base metal applied to the selenium layer, preferably when the latter is in the metallic state.

The current used in the electrolytic process can vary from 2½ ma. up to 50 ma. and the time within which the process has to be performed is varied inversely as the current is used in attaining the same quality rectification and correspondingly the time varies from 300 seconds down to 15 seconds. By increasing the time in which the process is performed or by increasing the current high voltage discs with reduced power rectification will be attained.

While I have disclosed the principles of my invention in connection with several different embodiments, it will be understood that these embodiments are given by way of example only and not as limiting the scope of the invention as set forth in the objects and the appended claim.

What I claim is:

A process for producing a dry rectifier including a rectifying layer on a base element having a cadmium surface, which comprises making the said surface the anode during electrolysis of an aqueous alkaline electrolyte containing dissolved solenium and an organic substance chosen from the class consisting of water soluble lower alcohols, aldehydes, ketones and organic acids, whereby a layer of cadmium organic polyselenide is produced on the cadmium surface, applying a layer of selenium on to said cadmium organic polyselenide and thereafter applying a layer of counterelectrode material onto the said selenium layer.

MURRAY J. STATEMAN.

REFERENCES CITED

The following references are of record in the file of this patent:

UNITED STATES PATENTS

| Number | Name | Date |
|---|---|---|
| 1,743,160 | Presser | Jan. 14, 1930 |
| 2,223,203 | Brunke | Nov. 26, 1940 |
| 2,391,706 | Jackson | Dec. 25, 1945 |